April 22, 1958  R. ADELL  2,831,723
ORNAMENTAL AND PROTECTIVE MOLDING FOR
EDGES OF AUTOMOBILE CLOSURES
Filed July 9, 1956

INVENTOR.
ROBERT ADELL
BY Gregory S. Dolgorukov
ATTORNEY.

United States Patent Office 2,831,723
Patented Apr. 22, 1958

2,831,723

ORNAMENTAL AND PROTECTIVE MOLDING FOR EDGES OF AUTOMOBILE CLOSURES

Robert Adell, Detroit, Mich., assignor to Franklin Z. Adell and Marvin M. Adell, both of Detroit, Mich.

Application July 9, 1956, Serial No. 596,653

1 Claim. (Cl. 296—44)

This invention relates to motor vehicles and more particularly to improved bodies thereof in which edges of various movable closures, such as doors, are provided with ornamental and protective moldings.

Provision of ornamental and edge protective moldings on the edges of such closures, as disclosed in my issued patents and pending patent applications, have now been recognized as being an expedient of great advantage. However, it has been found that provision of such moldings and particularly of practical means for retaining such moldings on the closure edges presents serious difficulties. It has been found that under many operation conditions, such as in hard slamming of the doors, as well as in closing doors provided with edge protective moldings but having insufficient clearance between the door edge and the door post, the moldings tend to fall off the edge.

One of the objects of the present invention is to provide an improved ornamental and edge protective molding for automobile closures such as doors, including improved means adapted to retain the moldings on the door edge in a positive manner and eliminating the possibility of such moldings coming off the edges of the closure even under very unfavorable operation conditions.

A still further object of the present invention is to provide an improved edge protective molding for automobile doors which is adapted to be retained on the door edge in a positive manner and yet be taken off in an easy and simple manner.

A still further object of the present invention is to provide an improved edge protective molding for automobile doors, which is simple and rugged in construction, dependable in use and relatively inexpensive to manufacture and to install.

Further objects and advantages of this invention will be apparent from the following description and appended claim, reference being had to the accompanying drawings forming a part of this specification, wherein like reference characters designate corresponding parts in the several views.

Figure 1:
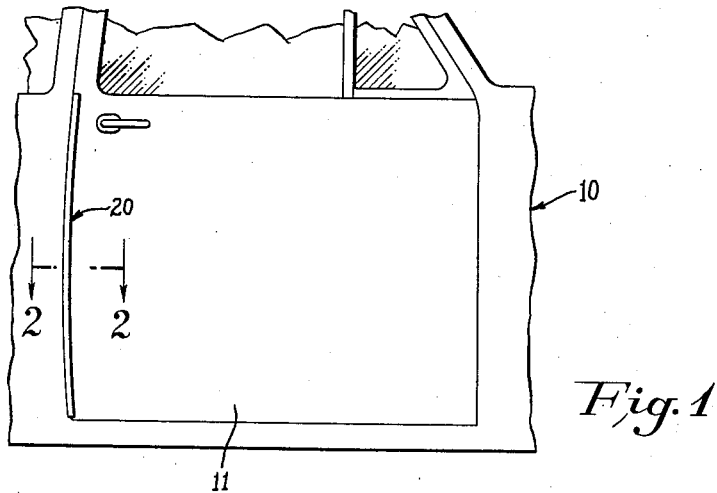
Fig. 1 is a fragmentary side view of an automobile having doors provided with an improved ornamental and edge protective molding embodying the present invention.
Figure 2:
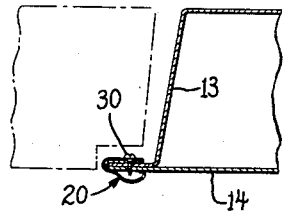
Fig. 2 is a sectional view taken in the direction of the arrows on the section plane passing through the line 2—2 of Fig. 1.
Figure 3:
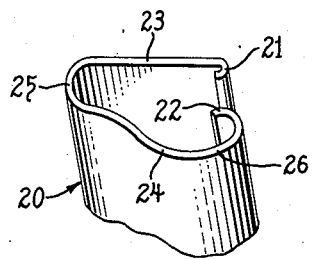
Fig. 3 is a perspective view showing the molding strip separately.

It is to be understood that the invention is not limited in its application to the details of construction and arrangement of parts illustrated in the accompanying drawings, since the invention is capable of other embodiments and of being practiced or carried out in various ways.

Also, it is to be understood that the phraseology and terminology employed herein is for the purpose of description and not of limitation.

In accordance with the invention, I provide a molding in which the molding strip has a substantially U-shaped cross section with the longitudinal edges of the molding being curled inwardly to provide smooth, rounded edges. The inner leg of the U may be substantially straight or flat, while the outer leg of the U is curved preferably to the outline of a question mark, with the lower end thereof merging smoothly into the curved closed end of the U. The flat inner leg of the U is secured to the door along the trailing edge thereof with the aid of self-tapping screws, said screws passing through the inner leg of the molding and engaging it with their heads, while the shanks of the screws pass through the door edge and come out on the other side thereof, protruding for a distance. However, because of the configuration of the outer leg of the molding, the same clears the screws completely. By virtue of such an expedient the several thicknesses of the sheet metal at the door edge are engaged by each screw with the full thread portion thereof, thus providing an exceedingly strong joint and eliminating the difficulties confronted in the attempts to use screw connectors not breaking through the outer surface of the door but engaging the sheets forming the edge with only the converging ends of such connectors.

Referring specifically to the drawings, there is shown therein an automobile having a door with a curvilinear trailing edge provided with an ornamental and edge protective molding embodying the present invention. The automobile is generally designated by the numeral 10 and is shown in fragmentary side elevation to illustrate the front door thereof designated generally by the numeral 11.

The door construction includes the inner sheet 13 bent to form a flange over which is wrapped the edge portion of the outer sheet 14 as is best shown at 15.

The molding comprises generally a strip 20 having a substantially U-shaped cross section, with the longitudinal edges of the strip, i. e. the ends of the legs of the U, being curled as indicated at 21 and 22 to provide smooth, rounded edges. The inner portion or leg 23 of the molding, i. e. the leg disposed on the inner side of the door, may be straight or flat, while the outer leg 24 is curved substantially to the shape of a question mark having its lower end merging smoothly into the curved closed end 25 of the molding. By virtue of such a construction, a hump 26 is provided which extends outwardly of the door for some distance.

The inner portion or leg 23 of the molding is secured to the door edge with the aid of a plurality of self-tapping screws 30, with each screw passing fully through the inner leg 23, the flange 15 and the sheets 13 and 14. Thus, the screw 30 engages the door with the portion of its shank having full screw thread thereon and provides for a strong and reliable joint. In spite of the fact that the end 31 of the screw protrudes for a considerable distance through the outer surface of the sheet 14, it does not affect the secure holding of the molding strip 20 and does not distort the same since provision of the hump 26 provides ample room for the end of the screw within the confines of the molding. The screw 30 protrudes through the outer sheet 14 of the door for such a distance as to ensure that the fastly tapering end 31 thereof protrudes well beyond the outer surface of the sheet. As is clearly shown in Figs. 4, 5 and 6 of the drawings, in all of the embodiments illustrated approximately one-third of the screw shank protrudes through the sheet 14 to attain the above purpose.

Figure 4:
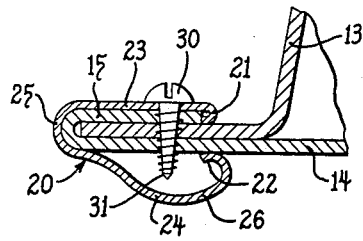
Fig. 4 is a view showing on an enlarged scale the portion of Fig. 2, including the trailing edge of the door and the molding operatively installed thereon.
Figure 5:
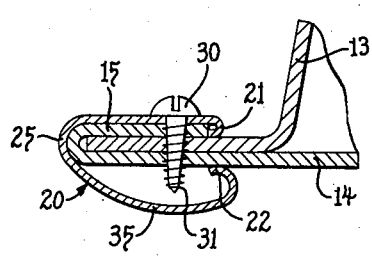
Figs. 5 and 6 are views similar in part to Fig. 4 but showing moldings of modified cross sections.

Fig. 5 illustrates a molding strip of a modified cross section in which the outer leg of the molding designated by the numeral 35 is curved outwardly through its entire length and does not include inward curvature found in the construction of Fig. 4. Such a construction presents a somewhat different visual appearance from that of the construction of Fig. 4 which, due to light reflection, may under certain conditions show several shiny streaks of light reflection.

Figure 6:
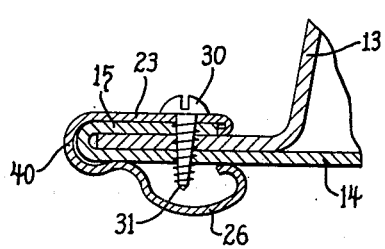

The construction of Fig. 6 is substantially similar to that of Fig. 4 with the exception that the closed end 40 thereof has inwardly directed curvature of a more pronounced nature than in the construction of Fig. 4. This molding is designed to wedge on and to pinch the door edge. Under certain conditions, such a construction possesses additional advantages.

While the present invention has been herein disclosed with reference to automobile doors, it will be understood that it is applicable to other automobile body closures, such as trunk lids, engine hoods, and the like. It will also be understood that while the present invention has been illustrated and described with reference to an ornamental and protective molding applied only to the lower portion of the trailing edge of the door, it is not limited to applications to only such portion and may be provided along the entire peripheral edge of the doors.

By virtue of the above disclosed construction, the objects of the present invention and numerous additional advantages are attained.

I claim:

In an automobile including a door having a trailing edge, an ornamental and edge protective molding provided at least on a portion of the total length of said trailing edge, said molding comprising a strip of sheet metal bent upon itself longitudinally to a generally U-shaped cross section, with the inner leg of the U being substantially straight and the outer leg of the U having the shape of a question mark with the lower end thereof merging smoothly into the closed end of the U, said straight leg being adapted to receive a plurality of self-tapping screws engaging the door along said edge to hold the molding in place, with the ends of said screws being disposed in their assembled positions underneath the portion of the outer leg having farthest outward extent, and with the closed end of the U being adapted to pinch the trailing edge.

References Cited in the file of this patent

UNITED STATES PATENTS

| | | |
|---|---|---|
| 2,226,615 | Killen | Dec. 31, 1940 |
| 2,685,472 | Adell | Aug. 3, 1954 |
| 2,685,473 | Adell | Aug. 3, 1954 |
| 2,704,687 | Adell | Mar. 22, 1955 |
| 2,733,097 | Stevens | Jan. 31, 1956 |